Figure 1:
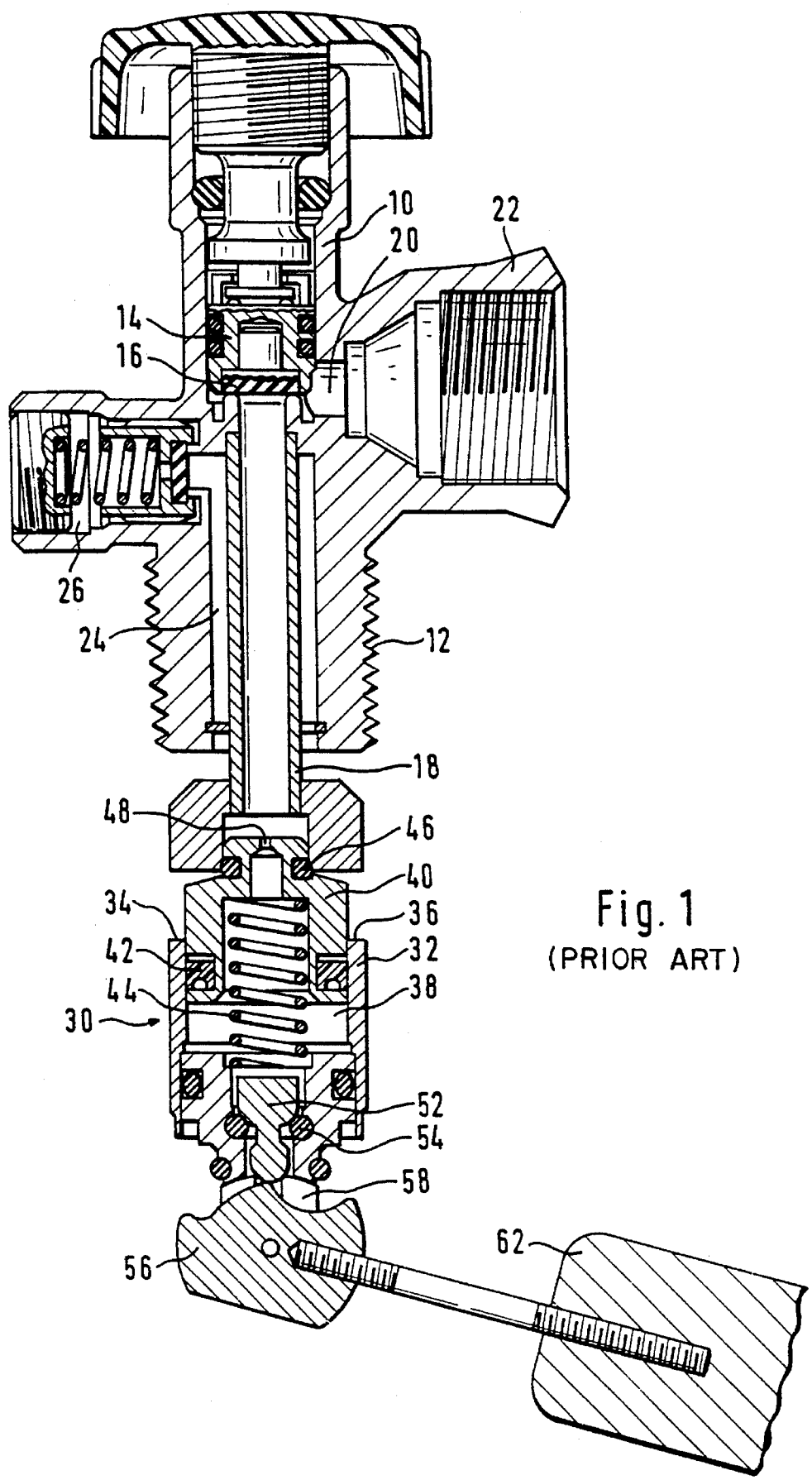

United States Patent
Kerger et al.

Patent Number: 5,460,197
Date of Patent: Oct. 24, 1995

[54] VALVE FOR A TAP OF A GAS CYLINDER AND TAP HAVING SUCH A VALVE

[75] Inventors: Leon Kerger, Helmdange, Luxembourg; Claude Goffin, Chenois, Belgium

[73] Assignee: Torrent Trading Ltd., Toltola, Virgin Islands (Br.)

[21] Appl. No.: 273,728

[22] Filed: Jul. 12, 1994

[30] Foreign Application Priority Data

Jul. 12, 1993 [LU] Luxembourg ............................ 88 377

[51] Int. Cl.$^6$ .................................................. F16K 17/36
[52] U.S. Cl. .......................... 137/39; 137/389; 137/413; 141/18; 141/198; 141/217
[58] Field of Search .............................. 137/38, 39, 389, 137/413; 141/18, 198, 217

[56] References Cited

U.S. PATENT DOCUMENTS

| | | | |
|---|---|---|---|
| 4,462,417 | 7/1984 | Trinkwalder | 137/39 |
| 4,469,117 | 9/1984 | Hansen | 137/39 |
| 5,282,496 | 2/1994 | Kerger | 141/18 |

*Primary Examiner*—Robert G. Nilson
*Attorney, Agent, or Firm*—Leydig, Voit & Mayer, Ltd.

[57] ABSTRACT

The valve (31) comprises at least two lateral openings (34, 36) which can be shut off by a plug (40) provided with an axial orifice (48) for the passage of gas and sliding axially in the casing (32) between a position in which the openings, (34, 36) are shut off under the influence of a spring (44) and an open position counter to the action of the spring (44) under the influence of the pressure of the filling gas, and a level valve (52) activated by a float (62) at the bottom of the casing (32).

The plug (40) comprises an inner cavity (70), the bottom of which has a cross-section in the shape of an open "V". In this cavity (70) is a ball (72) which prevents the cylinder from being filled when the latter is inclined sufficiently for the ball not to be situated at the bottom of the cavity (70).

4 Claims, 2 Drawing Sheets

VALVE FOR A TAP OF A GAS CYLINDER AND TAP HAVING SUCH A VALVE

The present invention relates to a two-way valve for a tap of a compressed or liquefied gas cylinder, which valve is intended to be fitted on an inlet pipe of the tap, to permit both the filling and the emptying of the gas cylinder, and comprising a casing with at least one lateral opening which can be shut off by a plug which is provided with a passage for gas and which can be displaced, under the influence of resilient means, between a position in which the openings are shut off and an open position counter to the action of the said resilient means and under the influence of the pressure of the filling gas, and a level valve activated by a means for detecting the filling level, it being possible for the said level valve to be opened by the pressure of the gas in the cylinder when it is not kept in the open position by the level-detection means and when the tap is open. The invention also relates to a tap provided with such a two-way valve.

A tap provided with such a two-way valve is known and described in more detail in French Patent Application No. 9,116,025 which corresponds to U.S. Pat. No. 5,282,496. This tap is more particularly intended for gas cylinders which can be refilled by the user himself in a gas supply centre. To fill such a cylinder correctly in accordance with safety regulations, the cylinder must not be filled completely in order to preserve, above the liquefied gas, a gaseous zone which can act as a buffer, in the event of the cylinder being exposed to a heat source, and which can be released via a safety valve which must therefore obligatorily be situated in this gaseous zone. To this end, the tap described in the abovementioned patent application comprises a two-way valve which enables the cylinder to be filled and emptied and which is combined with a level valve which, whilst the cylinder is being filled, automatically closes the two-way valve when the gas level in the cylinder reaches a predetermined threshold.

The level valve operates under the control of a float which is moved by the upper level of the liquid surface of the gas.

This automatic closure system which stops the filling when the level reaches a predetermined threshold operates very reliably when the cylinder is upright. However, when the cylinder is inclined or horizontal during filling, the movement of the float becomes unpredictable and it is no longer capable of stopping the filling when the contents of the cylinder reaches the desired threshold. The safety measures invoked above are therefore no longer fulfilled if the filling takes place in a horizontal or highly inclined position of the cylinder.

The object of the present invention is to provide a novel two-way valve for such a tap which prevents the cylinder from being filled when the latter is not in a vertical or almost vertical position.

In order to achieve this aim, the invention provides a two-way valve of the type described in the pre-characterizing clause, which is characterized in that the said plug consists of an upper piston comprising an upper part of the said passage, and of a lower piston comprising a lower part of the said passage, the said upper and lower pistons being integrally connected to each other and defining between them a cavity into which the upper and lower parts of the passage open, in that the bottom of the cavity has a cross-section in the shape of a very open "V", in that the said cavity contains a ball which, in normal circumstances, rests, when the valve stands vertically, on the upper edge of the lower part of the passage which opens into the point at the bottom of the cavity, in that the lower piston is traversed vertically by a duct joining the said cavity to the base of the lower piston, and in that the total cross-section of the opening freed by the level valve, in its open position, is greater than the cross-section of the said duct and less than the sum of the cross-sections of the said lower part of the passage and of the duct.

The ball must shut off the lower part of the passage through the lower piston to allow the cylinder to be filled, which is the case when the cylinder stands vertically, given that the ball, under its own weight and under the influence of the inclination of the bottom of the cavity, rests on the edge of this passage. Conversely, when the cylinder is inclined at an angle greater than the inclination of the bottom of the cavity, the ball rolls towards the wall of the cavity, thus freeing the lower part of the passage, which prohibits filling.

The upper and lower parts of the passage preferably have the same cross-section and can be arranged on the axis of the upper and lower pistons.

To prevent the ball from shutting off the upper part of the passage whilst the cylinder is being emptied, the roof of the cavity can have a cross-section in the shape of a circumflex, and the upper part of the passage can open into the cavity next to the apex of the roof.

Figure 2:
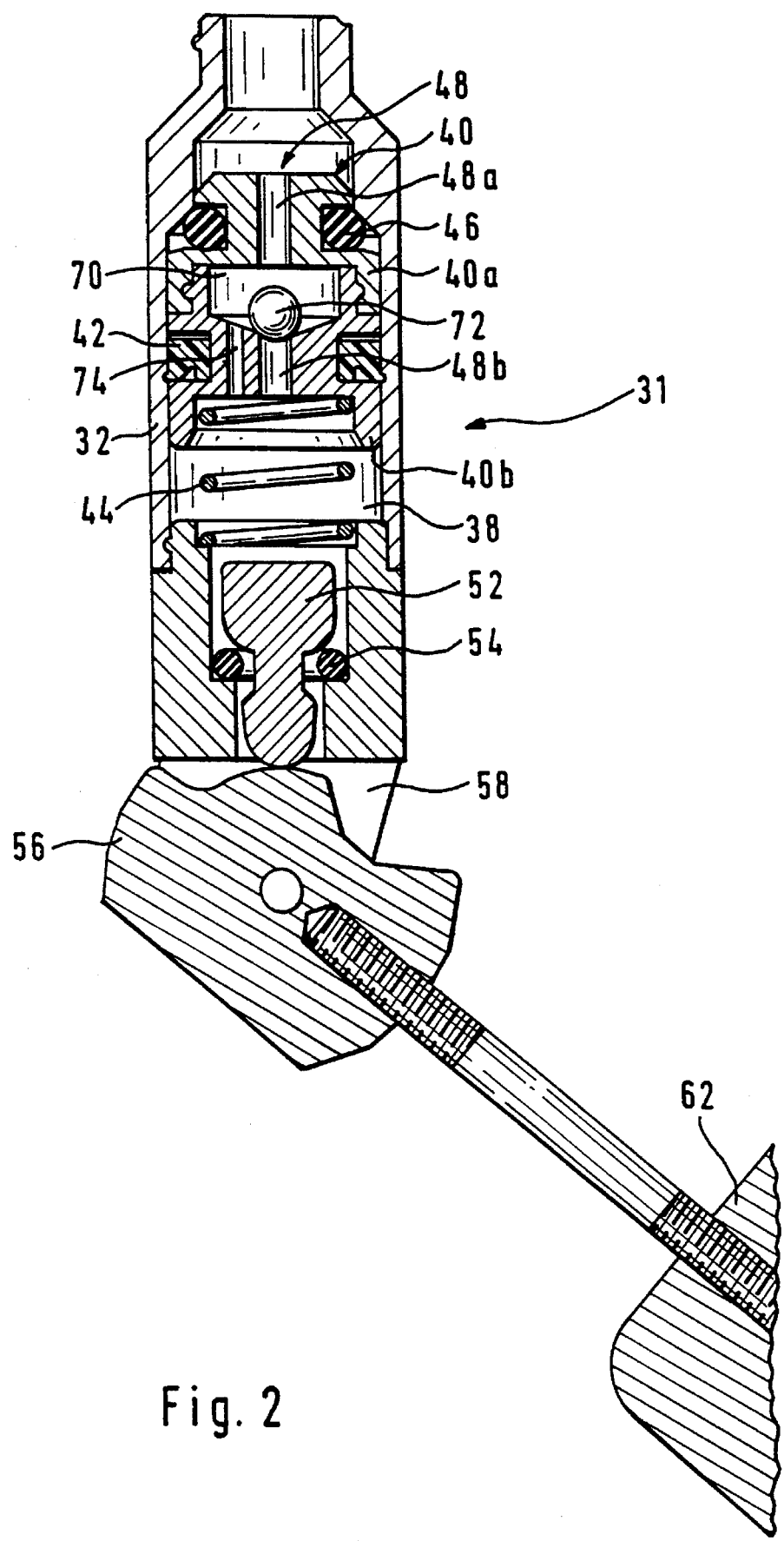

Other features of the invention will become apparent from an advantageous embodiment presented below, by way of example, with reference to the attached drawings, in which:

FIG. 1 diagrammatically illustrates a vertical section through a known tap described in French Patent Application No. 9,116,025, and FIG. 2 illustrates a vertical section through a two-way valve according to the present invention and designed for the tap in FIG. 1.

The structure and operation of the known tap will now be summarized briefly with reference to FIG. 1. The reader should refer to French Patent Application No. 9,116,025 for further details.

The tap illustrated in this figure comprises a metal body 10, for example made of brass, the lower part of which is provided with a thread 12 allowing the tap to be screwed onto a gas cylinder. The tap comprises a closure member 14 with a seal 16 at the intersection of an axial inlet duct 18 communicating with the inside of the cylinder, and a radial outlet duct 20 communicating with a connecting socket 22 which can be connected to a use circuit. The closure member 14 is activated manually using a lever or an operating wheel.

A passage 24 which establishes communication between the inside of the cylinder and a safety valve 26 is situated around the inlet duct 18. This valve allows gases to escape in the event of an abnormal excess pressure of the gas inside the cylinder. To this end, the passage 24 must obligatorily be in the gaseous zone, i.e. the cylinder cannot be filled up to the body 10 of the tap.

The inlet duct 18 is connected, inside the cylinder, to a two-way valve 30 which enables the gas cylinder to be both filled and emptied. This valve 30 comprises a casing 32 with two lateral openings 34 and 36. Inside this casing 32 is situated a cylindrical chamber 38 containing a plug 40 in the form of a piston which can slide axially and the sealing contact of which with the casing 32 is ensured by an O-ring 42. This piston 40 is subject to the action of a spring 44 which tends to maintain the piston 40 in the position in FIG. 1, in which its head is held, via a seal 46, leaktightly against the edge of the casing 32 in order to isolate the two lateral openings 34, 36 of the inlet duct 18. The chamber 38 communicates with the inlet duct 18 via an axial passage 48 through the piston 40.

The lower part of the valve 30 consists of the actual level valve 52. This valve 52 can slide axially between an open position freeing an annular passage for the gases between the casing 32 and the periphery of the valve 52, and a closed position in which the valve 52 is held leaktightly via a seal 54 against the lower part of the casing 32, forming the seat for this valve 52.

The valve 52 comprises a rounded foot which interacts with a cam 56 mounted pivotably in a clevis joint 58 of the casing 32. This cam 56 has a profiled contour designed so as to cause the valve 52 to move axially by its foot sliding along this profiled contour. The cam 56 is caused to pivot by a float 62 as the level of the liquified gas in the cylinder rises and falls.

When the cylinder is empty, the float 62 is in a lower position, whilst the level valve 52 is in a raised and open position under the influence of the cam 56. The connecting socket 22 is connected to a gas source with a view to filling the cylinder, and the closure member 14 is opened by the operating wheel. The gas enters under pressure through the inlet pipe 18 and, as a result of its pressure, depresses the piston 40 counter to the action of the spring 44 as far as the bottom of the chamber 38, thus freeing the two lateral openings 34 and 36 for the gas to pass into the cylinder.

The gas also enters through the passage 48 of the piston 40 and flows around the valve 52, in the open position, into the cylinder. A build-up of pressure in the chamber 38 must be prevented, as pressurization of said chamber 38 would be liable to cause the piston 40 to rise up and close the two lateral openings 34 and 36. To this end, the cross-section of the annular passage for gas flow around the valve 52 must be greater than the cross-section of the passage 48 in order to prevent the gas in the chamber 38 from being compressed.

When the float 62 pivots, as a result of the cylinder being filled, in an anticlockwise direction beyond the angular position in FIG. 1, the cam 56 releases the valve 52 to fall onto the seal 54 under the pressure of the filling gas. As soon as the valve 52 is closed, the increase in the pressure inside the chamber 38, combined with the action of the spring 44, causes the piston 40 to rise up and close the passage for the gas through the openings 34 and 36, and thus terminate the filling process.

In order to use the gas contained in the cylinder, you simply need to open the tap using the operating wheel. When the cylinder is completely full and the level valve 52 is closed, the flow of the gas from the chamber 38 and from the inlet pipe 18 lowers the pressure in this chamber 38 and allows the pressure of the gas in the cylinder to lift the level valve 52 into an open position. The gas can then flow around the valve 52 and escape through the passage 48 of the piston 40. Once the level of the liquid gas in the cylinder has fallen as far as the position of the float 62 in FIG. 1, the valve 52 is held open by the circular cross-section of the profiled contour of the cam 56 and there is nothing to prevent the flow of gas through the valve 30 each time the tap is opened.

The feature of this tap is consequently that it stops the filling operation automatically without requiring the attention or intervention of the user, and does so by means of a two-way valve enabling the cylinder to be emptied via the level valve and in accordance with the safety regulations which dictate that the entire gaseous zone must be situated within the field of action of the safety valve.

FIG. 2 shows a novel two-way valve 31 intended for the tap in FIG. 1 and designed specially, according to the present invention, to prevent the cylinder from being filled when it is horizontal or inclined at a certain angle. The same reference numerals have been used in FIG. 2 for those elements which correspond to those in FIG. 1.

The openings 34 and 36 of the casing 32, which can be seen in FIG. 1, cannot be seen in FIG. 2 as they are situated in the plane perpendicular to the sheet of paper. They are, however, situated at a level so that they are masked or freed by the plug 40 following the axial sliding of the latter in the casing 32.

The plug 40 of the valve 31 consists of an upper piston 40a and a lower piston 40b, integrally connected to each other, for example by screwing, and each provided with a seal 46 and 42, respectively. The passage 48 through the plug 40 thus comprises an upper part 48a through the piston 40a, and a lower part 48b through the piston 40b.

The adjacent faces of the pistons 40a and 40b are designed so as to define, between the pistons, a cavity 70 into which the parts 48a and 48b of the passage 48 open. The base of this cavity 70 has a slightly conical shape with a cross-section in the shape of a "V", the tip of which is situated in the centre of the passage 48b. This cavity 70 contains a ball 72, for example made from metal, which can move freely within the cavity 70.

The lower piston 40b is traversed vertically by a duct 74 which establishes communication between the cavity 70 and the chamber 38. The cross-section of this duct 74 is less than the annular open cross-section around the level valve 52 in the raised position of the latter, this annular open cross-section being in turn less than the sum of the cross-sections of the passage 48b and of the duct 74.

The operation of the valve 31, which is illustrated in FIG. 2 in the closed position of the plug 48, will now be described. When the cylinder stands vertically, the ball, under its own weight, is situated at the bottom of the cavity 70 on the upper edge of the passage 48b.

When the tap in FIG. 1 equipped with the valve 31 in FIG. 2 is connected to a source of pressurized gas with a view to filling the cylinder, the gas, under the influence of its pressure, forces back the plug 40 counter to the action of the spring 44, freeing the lateral openings (34 and 36 in FIG. 1) which cannot be seen in FIG. 2 and allows the gas to enter the cylinder. The gas also enters through the passage 48a into the cavity 70, and its pressure holds the ball 72 at the bottom of the cavity and thus blocks the passage 48b. The gas then flows via the duct 74 into the chamber 38 and, from there, via the open valve 52 into the cylinder. Given that the open cross-section of the valve 52 is greater than that of the duct 74, the chamber 38 is not pressurized and there is no rising force on the plug 40 so that the latter remains in an open position.

If, on the other hand, the cylinder is horizontal or simply inclined at an angle greater than the angle of the slope of the bottom of the cavity 70, the ball 72 rolls towards the edge of the cavity and frees the entrance of the passage 48b, which allows the gas to pass via the duct 74 and via the passage 48b into the chamber 38. Given that the combined cross-sections of the duct 74 and the passage 48b are greater than the annular open cross-section of the valve 52, the volume of gas which enters the chamber 38 is greater than that leaving it. Consequently, the pressurization of the chamber 38, with the aid of the action of the spring 44, causes the plug to rise up and the lateral openings to close. The filling process cannot be continued thereafter.

The gases inside the cylinder are drawn off in a similar way to the drawing-off with the tap in FIG. 1 which is described in French Patent Application No. 9,116,025.

When the valve 52 is open, the gas can freely traverse the duct 74, the cavity 70 and the passage 48a. Furthermore, the pressure of the gas will be sufficient to raise the ball so that the gas can also pass through the passage 48b. Compared with the two-way valve 30 in FIG. 1, the valve 31 in FIG. 2 consequently permits a higher throughput because of the limited cross-section of the passage 48 in FIG. 1.

In high-pressure cylinders it is possible for the pressure to be sufficient to raise the ball 72 and force it against the lower edge of the passage 48a. The gas outlet would thus be blocked. In order to obviate such an eventuality, it is possible to provide, beneath the passage 48a, means such as a diametral bar, a helical spring, etc. which prevent the passage 48b from being obstructed by the ball. It is also possible to design the roof of the cavity 70 with a cross-section in the shape of a circumflex and to provide the passage 48a next to the apex of the roof, for example offset relative to the piston 40a, so that it does not block the passage 48a even if the ball is forced towards the apex of the roof.

We claim:

1. Two-way valve for a tap of a compressed or liquefied gas cylinder, which valve is intended to be fitted on an inlet pipe (18) of the tap, to permit both the filling and emptying of the gas cylinder and comprising a casing (32) with at least one lateral opening (34, 36) which can be shut off by a plug (40) which is provided with a passage (48) for gas and which can be displaced, under the influence of resilient means, between a position in which the openings are shut off and an open position counter to the action of the said resilient means and under the influence of the pressure of the filling gas, and a level valve (52) activated by a means (62) for detecting the filling level, it being possible for the said level valve (52) to be opened by the pressure of the gas in the cylinder when it is not kept in the open position by the level-detection means (62) and when the tap is open, characterized in that the said plug (40) consists of an upper piston (40a) comprising an upper part (48a) of the said passage (48), and of a lower piston (40b) comprising a lower part (48b) of the said passage (48), the said upper (40a) and lower (40b) pistons being integrally connected to each other and defining between them a cavity (70) into which the upper (48a) and lower (48b) parts of the passage (48) open, in that the bottom of the cavity (70) has a cross-section in the shape of a very open "V", in that the said cavity (70) contains a ball (72) which, in normal circumstances, rests, when the valve stands vertically, on the upper edge of the lower part (48b) of the passage (48) which opens into the point at the bottom of the cavity (70), in that the lower piston (40b) is traversed vertically by a duct (74) joining the said cavity (70) to the base of the lower piston (40b), and in that the total cross-section of the opening freed by the level valve (52), in its open position, is greater than the cross-section of the said duct (74) and less than the sum of the cross-sections of the said lower part (48b) of the passage and of the duct (74).

2. Valve according to claim 1, characterized in that the upper and lower parts of the passage (48) have the same cross-section.

3. Valve according to claim 1, characterized in that the said upper and lower parts of the passage (48) traverse the upper piston (40a) and the lower piston (40b) respectively, in an axial fashion.

4. Tap for compressed or liquefied gases, comprising a tap body (10) designed to be fitted on a gas cylinder and containing a closure member (14) at the intersection of an inlet pipe (18) and an outlet pipe (20), a means for operating the closure member, a safety valve (26), a two-way valve enabling the gas cylinder to be both filled and emptied, comprising a casing (32) with at least one lateral opening (34, 36) which can be shut off by a plug (40) provided with a passage (48) for gas and which can be displaced between a position in which the openings (34, 36) are shut off under the influence of a resilient means (44), and an open position counter to the action of the resilient means (44) under the influence of the pressure of the filling gas, and a valve (52) activated by a means (62) for detecting the filling level, characterized in that the two-way valve is a valve according to claim 1.

* * * * *